US008595760B1

(12) United States Patent
Singh (10) Patent No.: US 8,595,760 B1
(45) Date of Patent: Nov. 26, 2013

(54) SYSTEM, METHOD AND COMPUTER PROGRAM PRODUCT FOR PRESENTING AN ADVERTISEMENT WITHIN CONTENT

(75) Inventor: Gurvinder Singh, Limassol (CY)

(73) Assignee: Amdocs Software Systems Limited, Dublin (IE)

( * ) Notice: Subject to any disclaimer, the term of this patent is extended or adjusted under 35 U.S.C. 154(b) by 676 days.

(21) Appl. No.: 11/562,896

(22) Filed: Nov. 22, 2006

(51) Int. Cl.
- *H04N 7/10* (2006.01)
- *H04N 7/025* (2006.01)
- *H04N 7/16* (2011.01)
- *G06Q 40/00* (2012.01)
- *G06Q 30/00* (2012.01)

(52) U.S. Cl.
USPC ............. 725/32; 725/35; 725/113; 725/114; 725/131; 725/139; 725/151; 705/37; 705/14.69

(58) Field of Classification Search
USPC ......... 725/32–36, 40, 42, 113, 114, 118, 131, 725/139, 151; 705/37, 14.4, 14.69
See application file for complete search history.

(56) References Cited

U.S. PATENT DOCUMENTS

| | | | | |
|---|---|---|---|---|
| 6,357,042 B2 * | 3/2002 | Srinivasan et al. | ............... | 725/32 |
| 7,080,392 B1 * | 7/2006 | Geshwind | ........................ | 725/34 |
| 7,313,804 B2 * | 12/2007 | Kurauchi et al. | ................ | 725/32 |
| 7,349,911 B2 * | 3/2008 | Kusama et al. | ......................... | 1/1 |
| 7,367,043 B2 * | 4/2008 | Dudkiewicz et al. | ......... | 725/138 |
| 7,434,247 B2 * | 10/2008 | Dudkiewicz et al. | ............ | 725/46 |
| 7,568,209 B1 * | 7/2009 | Addington et al. | ............. | 725/32 |
| 7,650,431 B2 * | 1/2010 | Wang et al. | .................... | 709/246 |
| 7,650,617 B2 * | 1/2010 | Hoshino et al. | ................. | 725/34 |
| 7,721,307 B2 * | 5/2010 | Hendricks et al. | .............. | 725/34 |
| 7,752,642 B2 * | 7/2010 | Lemmons | ........................ | 725/32 |
| 7,992,165 B1 * | 8/2011 | Ludewig et al. | ................ | 725/32 |
| 2001/0049824 A1 * | 12/2001 | Baker et al. | ..................... | 725/109 |
| 2002/0092017 A1 | 7/2002 | Klosterman et al. | ............ | 725/35 |
| 2002/0131511 A1 * | 9/2002 | Zenoni | ..................... | 375/240.28 |
| 2002/0166119 A1 * | 11/2002 | Cristofalo | ........................ | 725/34 |
| 2002/0174439 A1 * | 11/2002 | Akiyama et al. | ............... | 725/100 |
| 2003/0149975 A1 * | 8/2003 | Eldering et al. | ................. | 725/34 |
| 2005/0010952 A1 * | 1/2005 | Gleissner et al. | .............. | 725/46 |
| 2005/0015795 A1 * | 1/2005 | Iggulden | ......................... | 725/20 |
| 2005/0096980 A1 * | 5/2005 | Koningstein | .................... | 705/14 |
| 2005/0137958 A1 * | 6/2005 | Huber et al. | ..................... | 705/37 |
| 2005/0204398 A1 * | 9/2005 | Ryal | ............................. | 725/112 |
| 2005/0289601 A1 * | 12/2005 | Park et al. | ........................ | 725/54 |
| 2006/0130095 A1 * | 6/2006 | Willis et al. | ..................... | 725/42 |

(Continued)

FOREIGN PATENT DOCUMENTS

WO    WO 2006/076661 A2    7/2006    ............. G06Q 30/00

OTHER PUBLICATIONS

"Double Fusion" http://www.doublefusion.com.

*Primary Examiner* — Pinkal R Chokshi
(74) *Attorney, Agent, or Firm* — Zilka-Kotab, PC (57) ABSTRACT

A data structure, method and computer program product are provided. In one embodiment, an advertising slot located within content is identified. In addition, an advertisement is presented utilizing the advertising slot based on at least one identifier associated with the content. In another embodiment, an advertising slot is inserted into content. Further, at least one identifier associated with the content is generated for being used in presenting an advertisement utilizing the advertising slot. In yet another embodiment, an advertising slot associated with content is identified. Moreover, an advertisement is correlated with the advertising slot utilizing at least one identifier associated with the content.

12 Claims, 9 Drawing Sheets

(56) References Cited

U.S. PATENT DOCUMENTS

| | | | |
|---|---|---|---|
| 2006/0265657 A1* | 11/2006 | Gilley | 715/730 |
| 2006/0294538 A1* | 12/2006 | Li et al. | 725/24 |
| 2007/0055986 A1* | 3/2007 | Gilley et al. | 725/34 |
| 2007/0130581 A1* | 6/2007 | Del Sesto et al. | 725/36 |
| 2007/0157228 A1* | 7/2007 | Bayer et al. | 725/34 |
| 2007/0198339 A1* | 8/2007 | Shen et al. | 705/14 |
| 2007/0214473 A1* | 9/2007 | Barton et al. | 725/28 |
| 2007/0226761 A1* | 9/2007 | Zalewski et al. | 725/32 |
| 2007/0300249 A1* | 12/2007 | Smith et al. | 725/19 |
| 2008/0046917 A1* | 2/2008 | de Heer | 725/32 |
| 2008/0046924 A1* | 2/2008 | Hood | 725/36 |
| 2008/0059348 A1* | 3/2008 | Glassman et al. | 705/35 |
| 2008/0059997 A1* | 3/2008 | Plotnick et al. | 725/32 |
| 2008/0066107 A1* | 3/2008 | Moonka et al. | 725/42 |
| 2008/0098420 A1* | 4/2008 | Khivesara et al. | 725/32 |
| 2008/0098423 A1* | 4/2008 | Malik | 725/34 |
| 2010/0186028 A1* | 7/2010 | Moore et al. | 725/32 |

\* cited by examiner

SYSTEM, METHOD AND COMPUTER PROGRAM PRODUCT FOR PRESENTING AN ADVERTISEMENT WITHIN CONTENT

FIELD OF THE INVENTION

The present invention relates to advertising, and more particularly to presenting advertisements in association with content.

BACKGROUND

Advertising has traditionally been a tool largely utilized by various companies to promote goods and/or services. Such advertising has included, for example, video advertisements (e.g. commercials), Internet advertisements, etc. However, such advertising has generally only benefited large advertisers capable of paying for the presentation of their advertisements within content having a heavy traffic now (e.g. movies, popular websites, etc.).

Largely due to the Internet, presenting content and advertisements associated with such content has become more accessible. For example, Google® advertisements have provided websites the ability to present advertisements, and to optionally do so in exchange for payment. Thus, small entities (e.g. individuals, companies, etc.) have been afforded the opportunity to advertise.

Nevertheless, presenting advertisements within video content has remained in the control of large advertisers and large content creators. Furthermore, taking advantage of any type of advertising opportunity has required cumbersome decision making on the part of the content creators and the advertisers (e.g. which advertisement to present, which content to be utilized for presenting an advertisement, etc.).

There is thus a need for overcoming these and/or other problems associated with the prior art.

SUMMARY

A data structure, method and computer program product are provided. In one embodiment involving the presentation of content, an advertising slot located within the content is identified. In addition, an advertisement is presented utilizing the advertising slot based on at least one identifier associated with the content. In another embodiment involving the generation of content, an advertising slot is inserted into the content. Further, at least one identifier associated with the content is generated for being used in presenting an advertisement utilizing the advertising slot. In yet another embodiment possibly involving an advertising slot bidding framework, an advertising slot associated with content is identified. Moreover, an advertisement is correlated with the advertising slot utilizing at least one identifier associated with the content.

DETAILED DESCRIPTION

Figure 1:
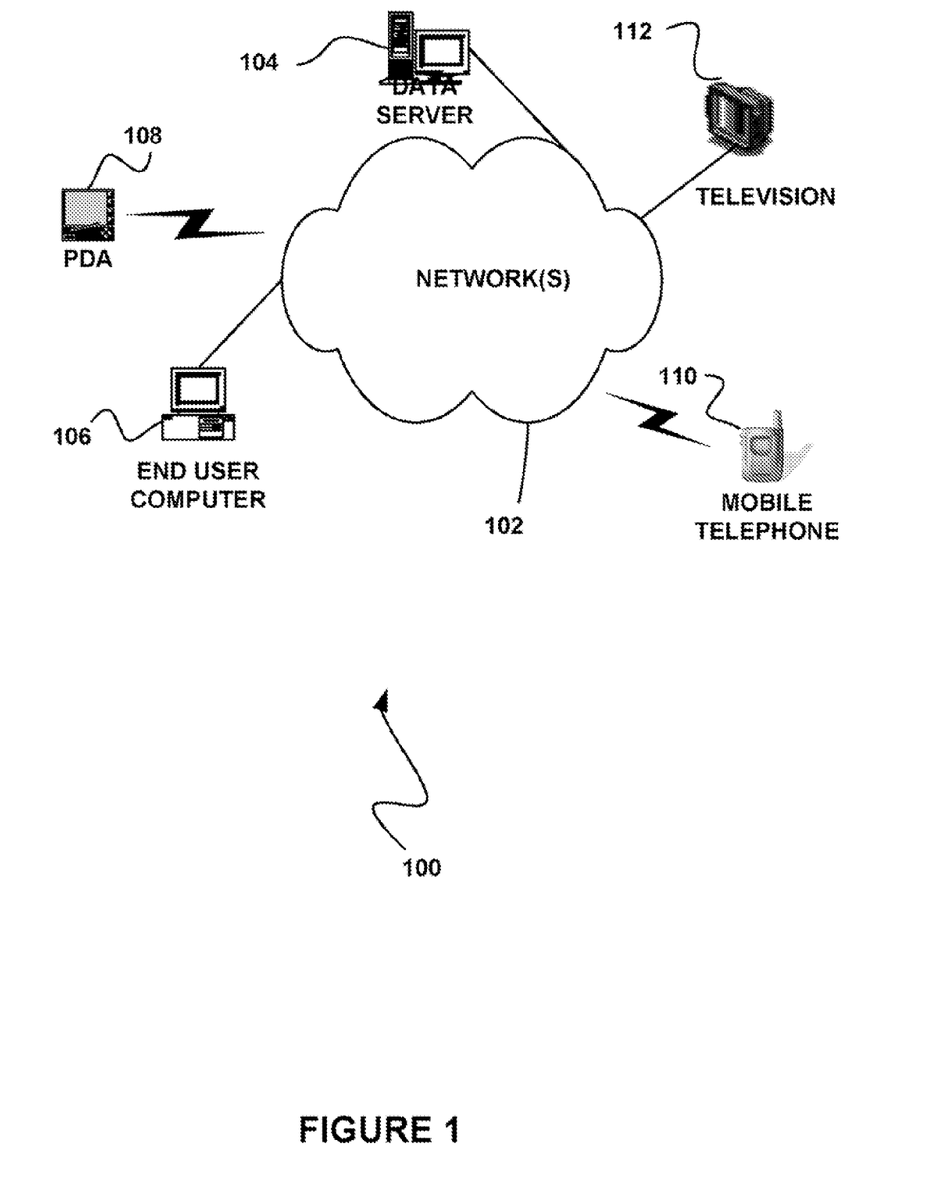
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
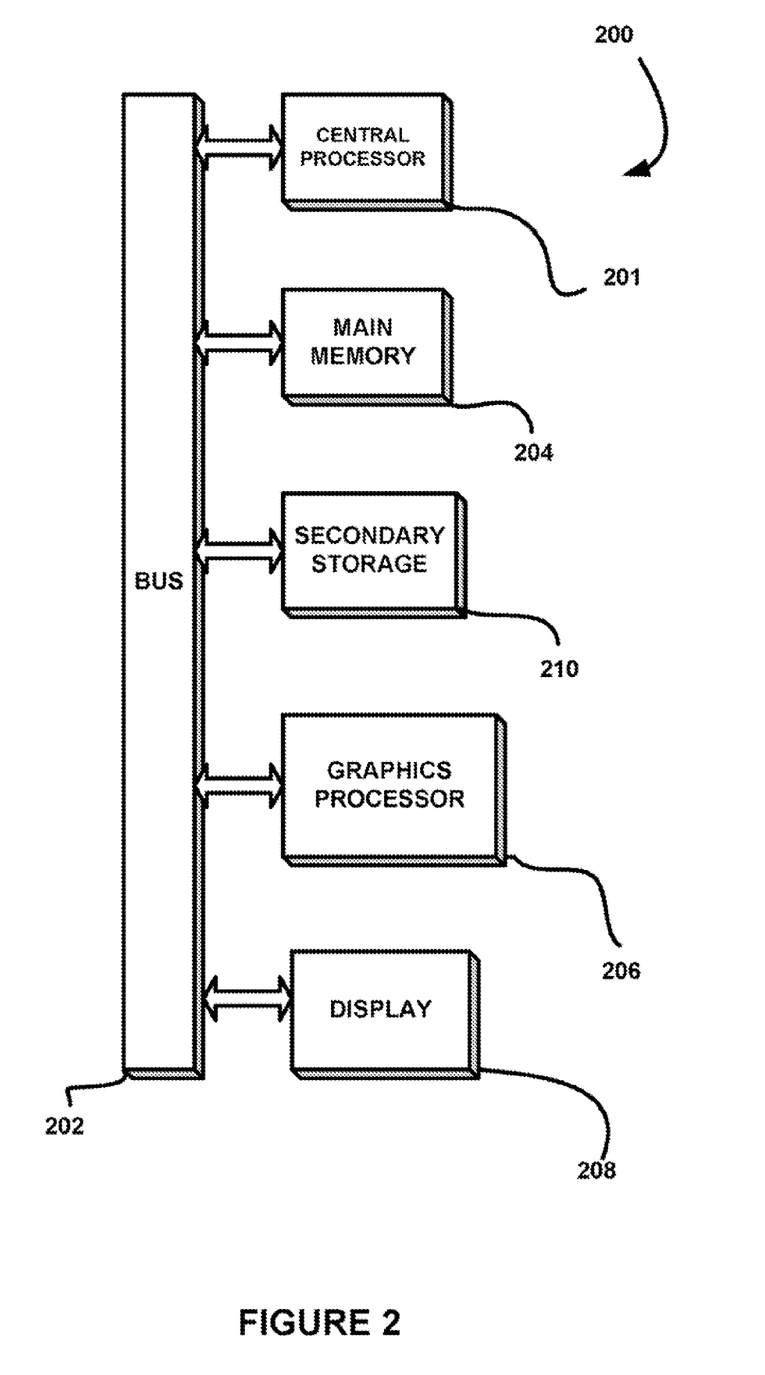
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 600 to perform various functions. Memory 204, storage 210 and/or any other storage are possible examples of computer-readable media.

Figure 3A:
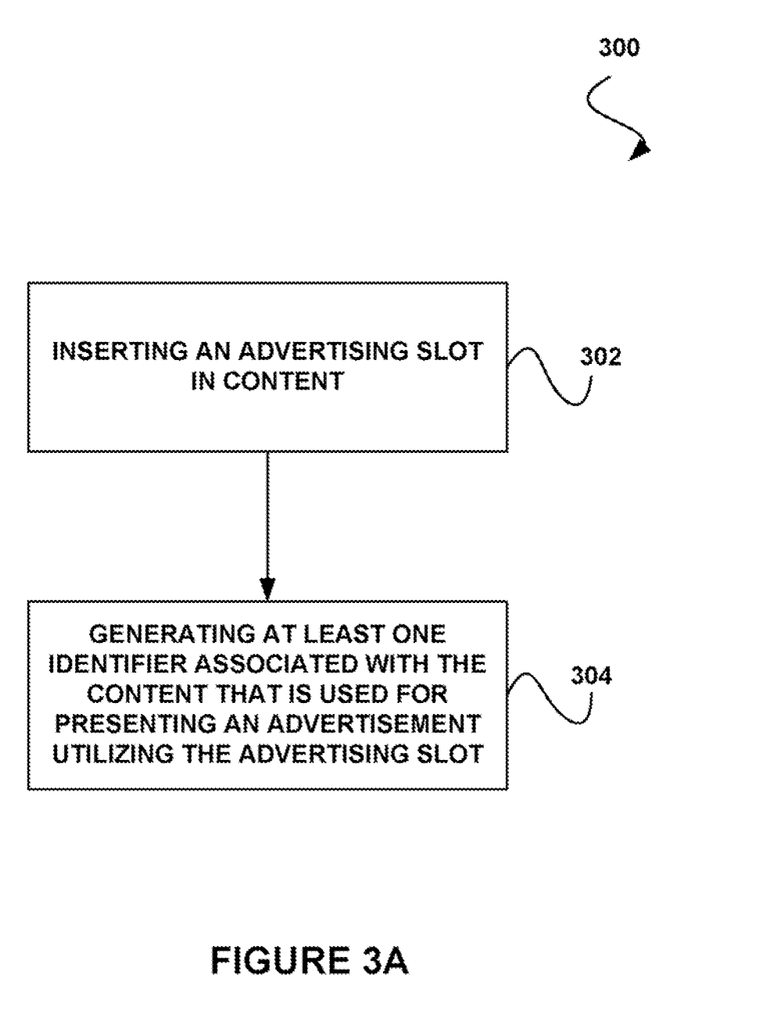
FIG. 3A shows a method for generating an identifier that is utilized for presenting an advertisement within content, in accordance with one embodiment involving the generation of content.

FIG. 3A shows a method 300 for generating an identifier that is utilized for presenting an advertisement within content, in accordance with one embodiment. As an option, the method 300 may be implemented in the context of the details of FIG. 1 and/or 2. Of course, however, the method 300 may be carried out in any desired environment. Further, the aforementioned definitions may equally apply to the description below.

As shown in operation 302, an advertising slot is inserted in content. In one embodiment, the content may include digital video content. For example, such digital video content may include a digital video, a digital video game, etc. Further, the content may be capable of being presented over a network, such as for example any of the networks described above with respect to FIG. 1.

In another embodiment, the content may include web content. Just by way of example, the content may include a web page. Of course, however, it should be noted that the content may include any content capable of having an advertising slot inserted therein.

Moreover, in another optional embodiment, the content may include at least one frame. In the context of the present embodiment, a frame may include an image within the content. Thus, the content may optionally include a plurality of frames, where each frame includes an image within a sequence of images.

Further, the advertising slot may include any slot (e.g. area, space, etc.) capable of being utilized for presenting an advertisement, as will be described in more detail with respect to operation 304. In one embodiment, the advertising slot may include at least a portion of the content in which an advertisement is capable of being presented. For example, the advertising slot may include a frame of the content, a portion of a frame of the content, etc.

In addition, the advertising slot may be inserted into the content in any desired manner. For example, the advertising slot may be embedded into the content. In one optional embodiment, the advertising slot may be inserted into the content utilizing a software application. Moreover, the advertising slot may be manually inserted into the content. Further, the advertising slot may be manually inserted into the content by a creator of the content.

In another example, the advertising slot may be automatically inserted into the content. Optionally, the advertising slot may be automatically inserted into the content by automatically identifying predetermined characteristics within the content. Such predetermined characteristics may include predetermined objects, for example. Thus, for instance, the advertising slot may be inserted into the content utilizing pattern recognition, where predetermined patterns for which an advertising slot may be inserted and which are capable of being located in content are identified.

Also, at least one identifier is generated, as shown in operation 304. Such identifier is associated with the content and may be used for presenting an advertisement utilizing the advertising slot. In one embodiment, the identifier may describe the content (e.g. a characteristic of the content, a category of the content, etc.). In another embodiment, the identifier may describe a frame of the content in which the advertising slot is inserted. This may be accomplished by identifying a frame number, sequence, hash signature, etc. Thus, the identifier may be associated with the advertising slot inserted within the content, for example.

In still yet another embodiment, the identifier may include a keyword. Optionally, the keyword may include a word and/or any other data that is relevant to the content. Of course, it should be noted, however, that the identifier may include any data associated with the content that is capable of being used for presenting an advertisement utilizing the advertising slot.

Additionally, in one optional embodiment, the identifier may be generated manually. For example, the identifier may be generated by a creator of the content. In another optional embodiment, the identifier may be generated automatically. Such automatic generation of the identifier may be based on the content (e.g. words, phrases, etc. within the content that are written and/or spoken, etc.).

Still yet, the advertisement that is presented utilizing the advertising slot may include any data capable of being presented (e.g. communicated, etc.). For example, the advertisement may be presented via a television (e.g. connected to a cable service, etc.), a computer connected to a network, etc.

In addition, the advertisement may be associated with an entity (e.g. government, company, organization, individual, etc.). Optionally, the advertisement may promote a good and/or service provided by the entity. Thus, in one embodiment, the advertisement may include a commercial associated with an entity.

In various other embodiments, the advertisement may be selectable by a receiver of the content. Thus, the advertisement may be utilized for presenting additional information associated with such advertisement. Such additional information may include, for example, a website of an associated advertiser, more information on a product and/or service associated with the advertisement, a survey/questionnaire associated with the advertisement, etc.

Furthermore, the advertisement may be presented utilizing the advertising slot in any desired manner. For example, the advertisement may be inserted into the advertising slot. In this way, the advertisement may be presented in conjunction with the presentation of the content. Thus, an advertising slot may be inserted into content and at least one identifier associated therewith may be generated, such that an advertisement may be presented utilizing the advertising slot.

Figure 3B:
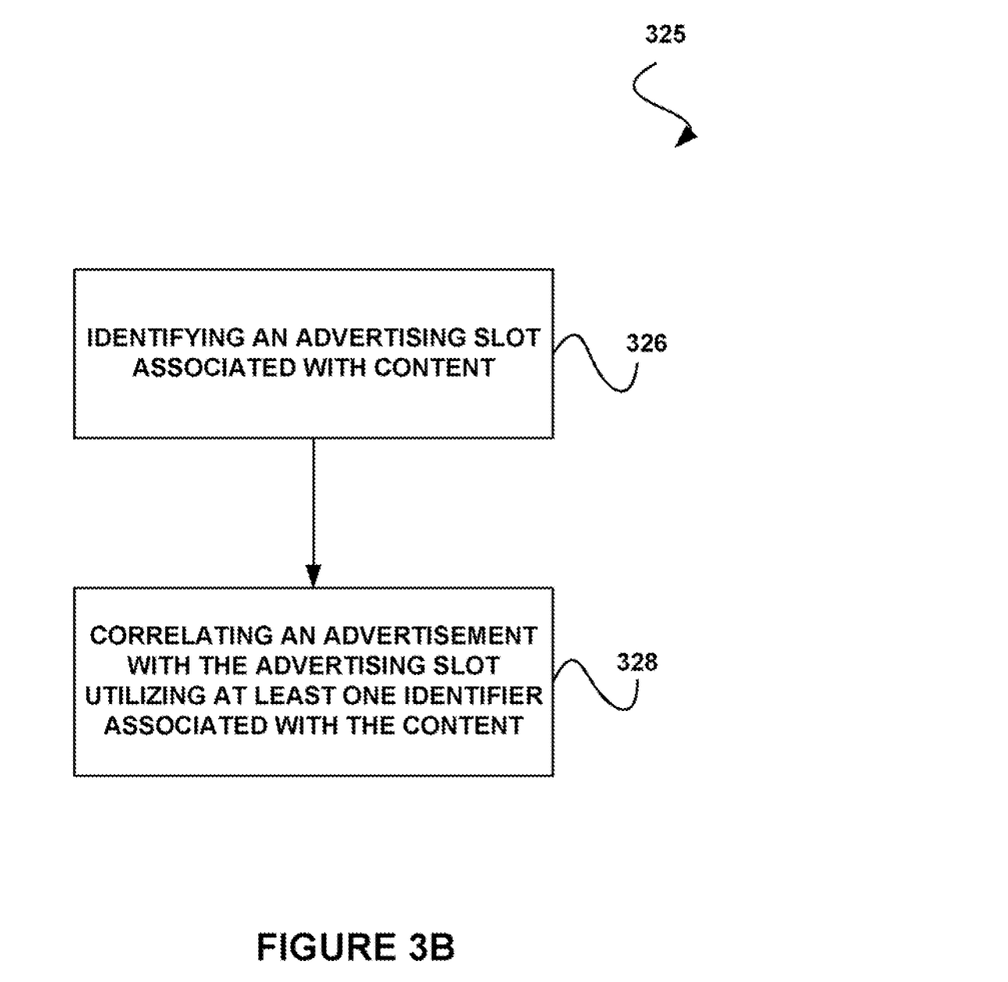
FIG. 3B shows a method for correlating an advertisement with an advertising slot, in accordance with another embodiment possibly involving an advertising slot bidding framework.

FIG. 3B shows a method 325 for correlating an advertisement with an advertising slot, in accordance with another embodiment possibly involving an advertisement bidding framework. As an option, the method 325 may be implemented in the context of the details of FIGS. 1-3A. Of course, however, the method 325 may be carried out in any desired environment. Further, the aforementioned definitions may equally apply to the description below.

As shown in operation 326, an advertising slot associated with content is identified. The advertising slot may be identified in any desired manner. In one embodiment, the advertising slot may be identified utilizing a software application (e.g. media player, administrator interface, portal, etc.).

For example, the advertising slot may be identified manually based on a selection of the advertising slot. As another option, the advertising slot may be identified automatically. For instance, the advertising slot may be identified automatically utilizing a media format of the content. One example of such media format will be described in more detail with respect to FIG. 6.

An advertisement is then correlated with the advertising slot utilizing at least one identifier associated with the content, as shown in operation 328. In one embodiment, the advertisement may be correlated with the advertising slot by inserting (e.g. embedding, etc.) the advertisement into the advertising slot associated with the content. Optionally, a pointer may be inserted into the advertising slot that points to the advertisement, for real-time or subsequent insertion.

In another embodiment, the advertisement may be correlated with the advertising slot utilizing a data format of the content associated with the advertising slot. Just by way of example, at least a portion of the data (e.g. meta-data, etc.) in the data format that is associated with the advertising slot may indicate the advertisement. Of course, however, the advertisement may be correlated with the advertising slot in any desired manner.

Further, in other embodiments, the advertisement may be correlated with the advertising slot utilizing the identifier associated with the content based on an association of the advertisement and the identifier. For example, in one possible embodiment, an advertiser associated with the advertisement may select the identifier for identifying content with an advertising slot in which the advertisement is to be correlated (e.g. for being presented, etc.). Optionally, the advertiser may bid on the identifier that identifies the content with an advertising slot in which the advertisement is to be correlated.

In this way, an advertiser with a highest bid for an identifier may have its advertisement correlated with an advertising slot of the content associated with the identifier. Of course, however, the advertisement may be correlated with the advertising slot utilizing the identifier in any desired manner.

Figure 3C:
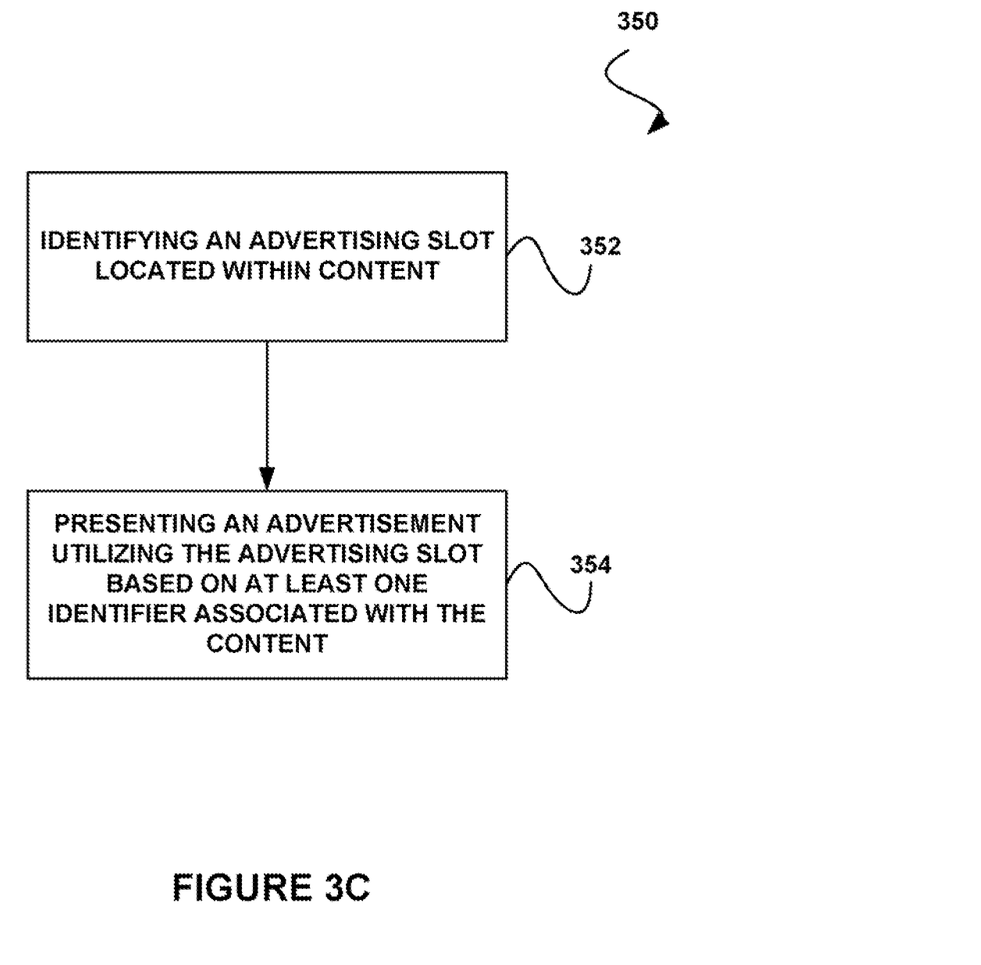
FIG. 3C shows a method for presenting an advertisement within content, in accordance with yet another embodiment.

FIG. 3C shows a method 350 for presenting an advertisement within content, in accordance with yet another embodiment. As an option, the method 350 may be implemented in the context of the details of FIGS. 1-3B. Of course, however, the method 350 may be carried out in any desired environment. Further, the aforementioned definitions may equally apply to the description below.

As shown in operation 352, an advertising slot located within content is identified. Such advertising slot may optionally be identified in any of the manners described above with respect to FIG. 3B. Of course, the advertising slot may also be identified in any desired manner.

Additionally, an advertisement is presented utilizing the advertising slot based on at least one identifier associated with the content, as shown in operation 354. For example, the advertisement may be presented based on the identifier in the manner described above with respect to FIG. 3B. It should be noted, however, that the advertisement may be presented based on the identifier in any desired manner.

In one embodiment, the advertisement may be presented by being displayed within the advertising slot. In another embodiment, the advertisement may be presented within one or more frames of the content utilizing the advertising slot. Further, the advertisement may be presented within a portion of the frame(s) utilizing the advertising slot, where the advertising slot is included within the portion of the frame(s). Thus, the advertisement may be presented in conjunction (e.g. synchronously, etc.) with other data within the content. In this way, the content may optionally be prevented from being interrupted during presentation of the advertisement, in accordance with one possible embodiment.

More illustrative information will now be set forth regarding various optional architectures and features of different embodiments with which the foregoing frameworks of FIGS. 3A-3C may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
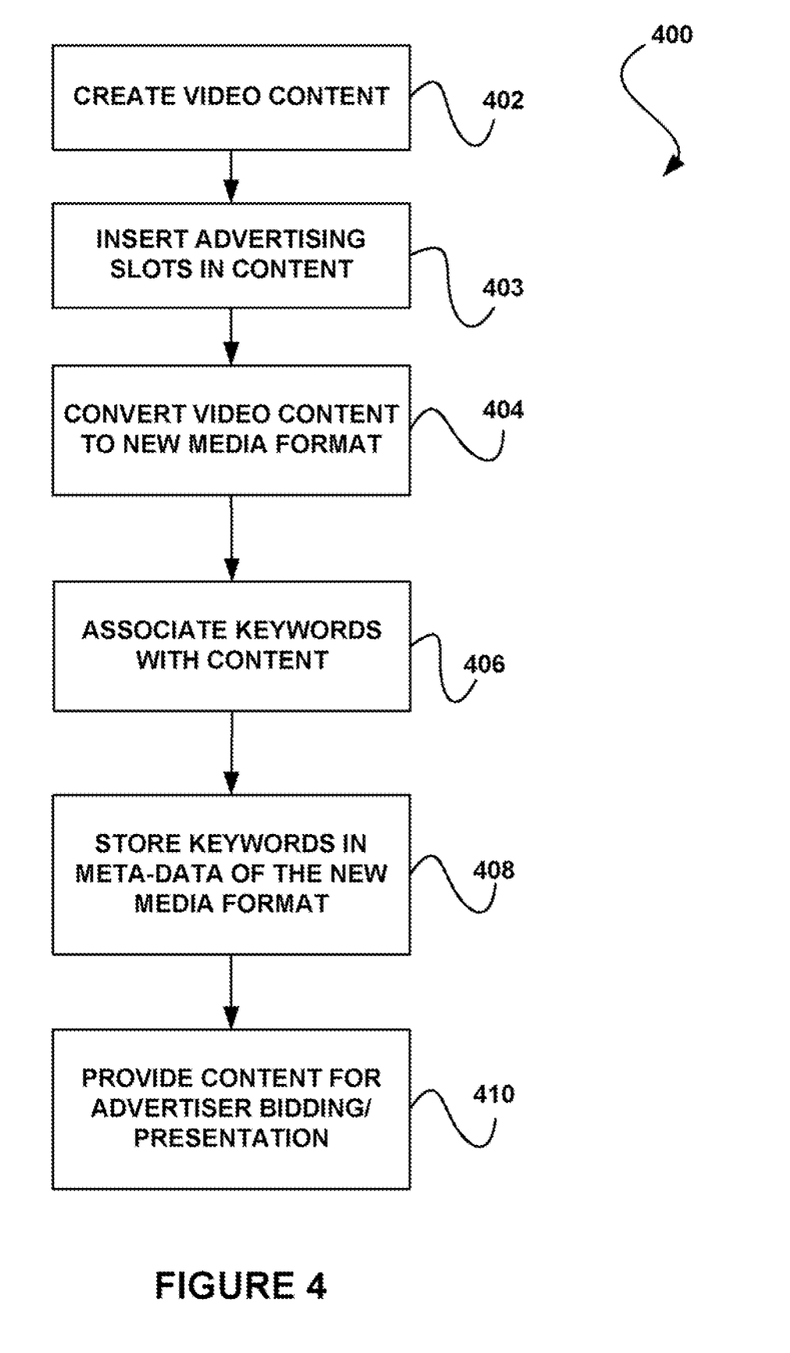
FIG. 4 shows a method for providing content for advertiser bidding/presentation, in accordance with another embodiment.

FIG. 4 shows a method 400 for providing content for advertiser bidding/presentation, in accordance with another embodiment. As an option, the method 400 may be implemented in the context of the details of FIGS. 1-3C. Of course, however, the method 400 may be carried out in any desired environment. Again, the aforementioned definitions may equally apply to the description below.

As shown in operation 402, video content is created. The video content may include any type of video capable of being displayed. In various embodiments, the video content may be displayed utilizing a television, a computer, etc.

In one embodiment, the video content may be created utilizing a video camera. Such video camera may optionally include a digital video camera, for example. Of course, however, the video content may be created in any desired manner. Just by way of example, the video content may be created from pre-recorded sources.

In addition, advertising slots may be inserted into the content, as shown in operation 403. Such advertising slots may be inserted into the content by selecting portions of the content in which an advertisement may be presented. Such selection may be performed manually and/or automatically, as described above with respect to FIG. 3A, for example.

The video content is then converted to a modified media format, as shown in operation 404. Thus, the video content may be created in a first media format, such that it is capable of being converted into a modified (e.g. different, etc.) media format. Such first media format may include any media format in which video content may be created.

In one embodiment, the modified media format may include a format that allows for the association of identifiers (e.g. keywords, etc.) with the content. In addition, the modified media format may include a format that provides advertising slots within the content. One example of such modified media format will be described in more detail with respect to FIG. 6.

As shown in operation 406, identifiers in the form of keywords are associated with the content. Such keywords may includes words, phrases, etc. that describe the content. For example, the keywords may describe characteristics of the content, categories of the content, etc.

In one embodiment, the keywords may be manually associated with the content. In this way, a user (e.g. content creator, etc.) may enter keywords for being associated with the content. In another embodiment, the keywords may be automatically associated with the content. Just by way of example, the keywords may be automatically associated with the content based on data (e.g. images, words, etc.) within the content.

Further, the keywords may be stored in meta-data of the modified media format, as shown in operation 408. Such meta-data may include, for example, data associated with the content. One example of such keyword meta-data will be described in more detail with respect to FIG. 7. In this way, the modified media format may associate the content with the keywords.

Moreover, the content is provided for advertiser bidding/presentation, as shown in operation 410. In one embodiment, the content may be provided to advertisers (e.g. made available to advertisers, etc.) such that the advertisers may optionally bid on advertising slots within the content. For example, the advertisers may generally bid on having an associated advertisement presented in the content utilizing any advertising slot.

As another option, the advertisers may bid on having an associated advertisement presented in a particular advertising slot of the content. Thus, advertisements may be presented utilizing advertising slots based on an auction of such advertising slots. Of course, the advertisers may also optionally purchase such advertising slots without having to bid thereon. In other various embodiments, the advertisers may be charged based on a number of presentations of associated advertisements to viewers, based on a number of selections by viewers to interact with associated advertisements, etc.

In yet another embodiment, the content may be provided to advertisers such that the advertisers may bid on keywords associated with the content. Thus, an advertiser's advertisement may be associated with a keyword based on such advertiser's bid on the keyword. In one embodiment, this may be accomplished utilizing one or more of the techniques described hereinabove with respect to FIG. 3B. One exemplary utilization of the association of the keyword and the advertisement will be described in more detail with respect to FIG. 5.

In this way, content created by any entity (e.g. individuals, small companies, large corporations, etc.) may be utilized for generating income. For example, the advertisers may pay at least a portion of their bids and/or purchases to the content creator. In another optional embodiment, at least a portion of the advertisers' payment may be received by a site hosting the content for presentation. In addition, any advertiser may bid on such advertising slots for presenting advertisements since such advertising slots may be easily generated and therefore readily available for purchase.

In another embodiment, the content may be provided for presentation by uploading the content onto a computer connected to a network. In this way, such content may be presented over the network. For example, the content may therefore be presented to advertisers.

Figure 5:
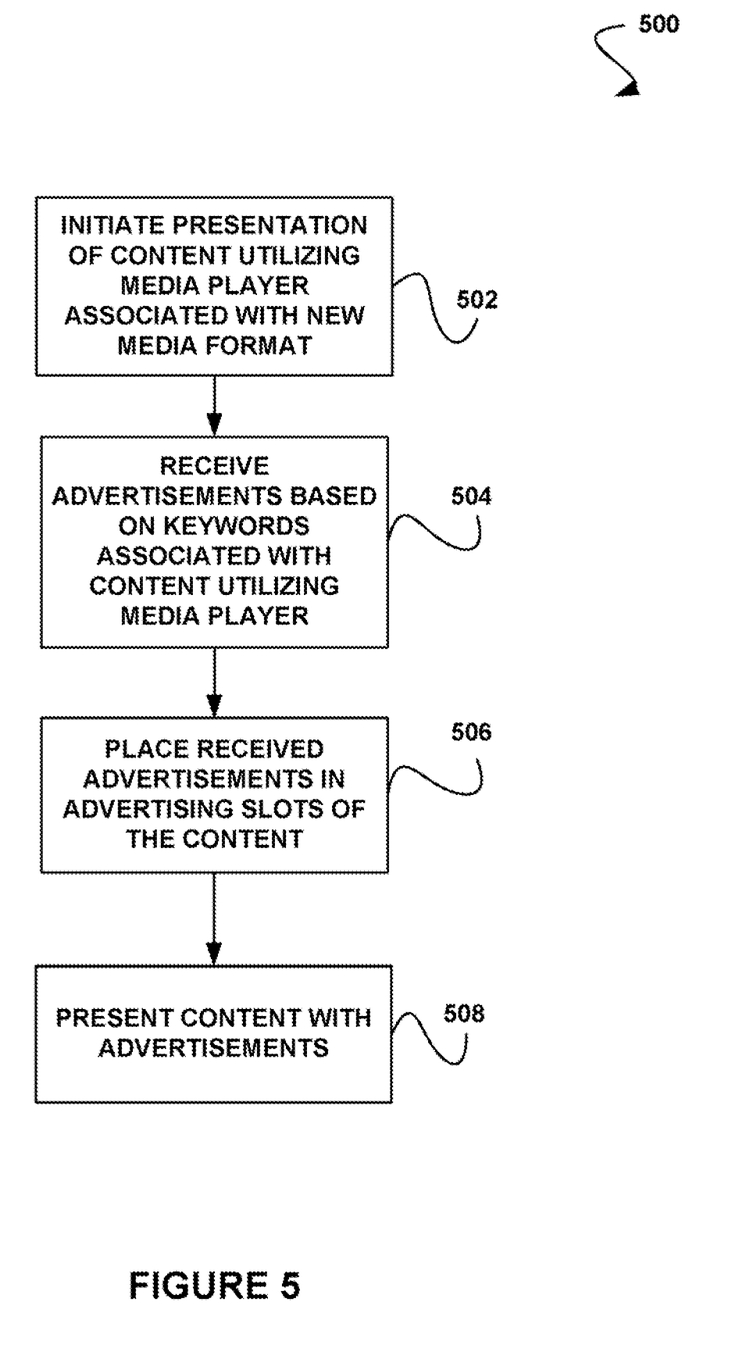
FIG. 5 shows a method for presenting an advertisement within content, in accordance with yet another embodiment.

FIG. 5 shows a method 500 for presenting an advertisement within content, in accordance with yet another embodiment. As an option, the method 500 may be implemented in the context of the details of FIGS. 1-4. Of course, however, the method 500 may be carried out in any desired environment. Again, the aforementioned definitions may equally apply to the description below.

As shown in operation 502, presentation of content is initiated utilizing a media player that is capable of supporting a modified media format. The media player may include any application, device, etc. associated with the modified media format. In this way, the media player may be capable of presenting the content associated with the modified media format. Optionally, the media player may be downloaded to a computer, such that the content may be displayed on such computer.

Additionally, the presentation of the content may be initiated by an entity (e.g. individual, etc.) capable of initiating the presentation of content. In one embodiment, the presentation of the content may be initiated based on a selection to present the content. For example, the presentation of the content may be initiated based on a selection performed utilizing the media player.

Further, advertisements are received based on keywords associated with the content utilizing the media player, as shown in operation 504. In one embodiment, the advertisements may be received based on associated advertisers that won bids in association with such keywords. In another embodiment, the advertisements may be received based on advertisers that purchased and/or bid on advertising slots associated with such keywords.

Thus, the advertisements may be identified and received based on the keywords. Of course, however, the advertisements may be received in any desired manner. In addition, the advertisements may optionally be received from a database of advertisements.

The received advertisements are then placed in advertising slots of the content, as shown in operation 506. In one embodiment, the received advertisements may be placed in the advertising slots by overlaying the advertisements onto the advertising slots. In another embodiment, the received advertisements may be placed in the advertising slots by being embedded in such advertising slots. It should be noted however that the received advertisements may be placed in the advertising slots in any desired manner.

It should be noted that the foregoing advertisement insertion may occur at anytime after the creation of the content. Thus, such insertion may or may not occur utilizing the software and/or hardware that ultimately presents the content. For example, the insertion may occur utilizing a server before the content is even delivered to the software and/or hardware that ultimately presents the content.

Still yet, the content is presented with the advertisements, as shown in operation 508. For example, the advertisement may be presented in advertising slots of the content. Accordingly, the advertisements may be presented in conjunction with the content such that the content is not necessarily interrupted (e.g. paused, etc.).

In addition, the content may be presented with the advertisements by displaying the content with the advertisements. Just by way of example, the content and advertisements may be displayed utilizing a television, a computer, etc. Further, the content may be presented with the advertisements utilizing the media player. As another option, the content may be presented with the advertisements by uploading the content onto a computer connected to a network. In this way, such content and associated advertisements may be presented over the network.

In one exemplary embodiment, the content may include a video in which a billboard utilized for advertising is presented. The billboard may be associated with an advertising slot, such that an advertisement may be presented on the billboard during a presentation of the video. It should be noted that such embodiment is set forth for illustrative purposes only, and therefore should not be construed as limiting in any manner.

Figure 6:
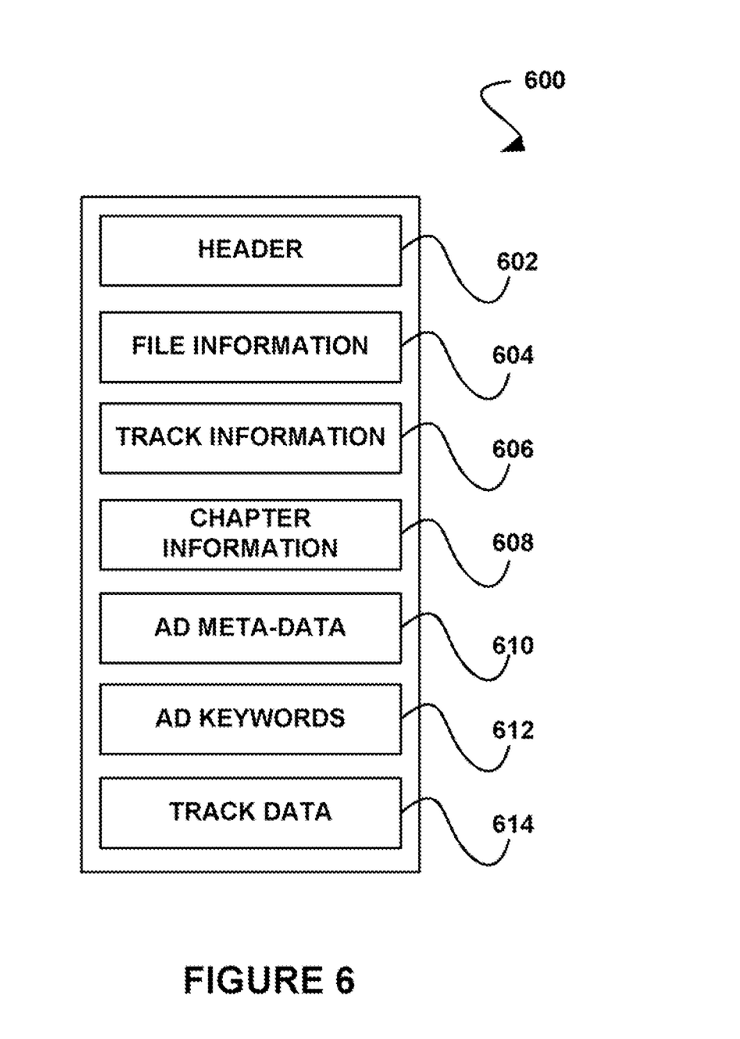
FIG. 6 shows a media format associated with content, in accordance with yet another embodiment.

FIG. 6 show a media format 600 associated with content, in accordance with yet another embodiment. As an option, the media format 600 may be implemented in the context of the details of FIGS. 1-5. Of course, however, the media format 600 may be used in any desired environment. Again, the aforementioned definitions may equally apply to the description below.

As shown, the media format 600 may include a container media format. Such container media format may include an open source multimedia container format (e.g. Matroska, etc.). Moreover, the media format 600 may be based a generalized file format for any kind of data [e.g. Extensible Binary Meta Language (EMBL), etc.]. Thus, in such an optional embodiment, the media format 600 may be a binary equivalent to XML. In various embodiments, the media format 600 may be utilized in internet protocol television (IPTV), digital video streaming, etc.

As also shown, the media format 600 may include a header 602. The header 602 may be utilized for identifying the content, frames of the content, etc. In addition, the media format 600 may include file information 604. For example, such file information 604 may include file data associated with the content (e.g. a file location, etc.).

Further, track information 606 may be included in the media format 600. The track information 606 may optionally include data associated with tracks of the content (e.g. subtitles, etc.). Chapter information 608 may also be included in the media format 600. Such chapter information 608 may include data associated with each chapter of the content (e.g. chapter title, etc.), for example.

Still yet, the media format 600 may include advertisement meta-data 610. In one embodiment, the advertisement meta-data 610 may include data associated with advertising slots.

More information regarding such advertisement meta-data 610 will be described in more detail with respect to FIG. 7.

Moreover, the media format 600 may include advertisement keywords 612. Thus, a list of keywords associated with the content may be included in the media format 600. Additionally, the media format 600 may include track data 614. The track data 614 may be encoded, as an option. Also, the track data 614 may include the portion of the content that is capable of being presented.

Figure 7:
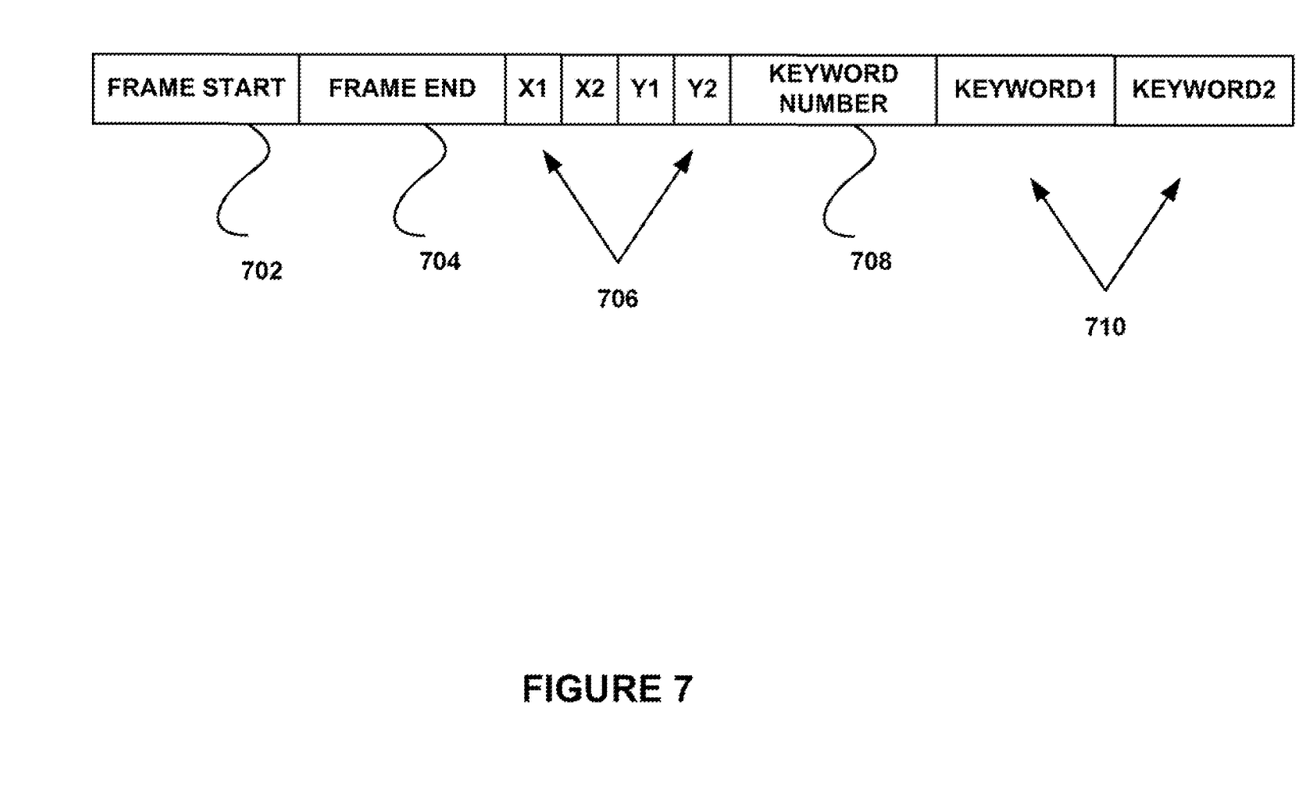
FIG. 7 shows advertisement meta-data included within a media format associated with content, in accordance with still yet another embodiment.

FIG. 7 shows advertisement meta-data 700 included within a media format associated with content, in accordance with still yet another embodiment. As an option, the advertisement meta-data 700 may be implemented in the context of the details of FIGS. 1-6. Of course, however, the advertisement meta-data 700 may be used in any desired environment. Again, the aforementioned definitions may equally apply to the description below.

The advertisement meta-data 700 may include data associated with advertising slots included in the content. In one embodiment, each advertising slot may be associated with a separate instance of the advertisement meta-data 700. Thus, each advertising slot may have data associated therewith.

As shown, the advertisement meta-data 700 may include a frame start indicator 702 and a frame end indicator 704. Such frame start indicator 702 and frame end indicator 704 may indicate the frames within content in which an associated advertising slot is included. In addition, the advertisement meta-data 700 may include position data 706 for identifying a location within frames associated with the frame start indicator 702 and the frame end indicator 704. In this way, the position data 706 may identify a particular area within such frames in which the advertising slot is located.

Further, the advertisement meta-data 700 may include a keyword number 708. The keyword number 708 may identify the number of keywords associated with the particular instance of the advertisement meta-data 700. As also shown, such keywords 710 may also be included. As an option, the keywords 710 may include a reference to keywords stored in the advertisement keywords section of the media format, as described above with respect to item 612 of FIG. 6.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying an advertising slot that has been inserted into content having a first format, where the content includes a plurality of frames;
    determining a plurality of keywords associated with the advertising slot;
    converting the content into a container media format different from the first format;
    storing within the container media format a header section utilized for identifying the content, a file information section that includes a file location of the content, a track information section that includes data associated with tracks of the content, a chapter information section that includes data associated with each chapter of the content, a track data section that includes a portion of the content to be presented, and an instance of metadata associated with the advertising slot, where the instance of metadata includes:
        a frame start indicator indicating the frame within the content in which the advertising slot starts,
        a frame end indicator indicating the frame within the content in which the advertising slot ends,
        position data that identifies a location where the advertising slot is located within the plurality of frames of the content,
        a keyword number indicating a number of the plurality of keywords, and
        the plurality of keywords associated with the advertising slot;
    providing the content and the instance of metadata within the container media format to a plurality of advertisers;
    receiving a bid on one of the plurality of keywords within the container media format from one of the plurality of advertisers;
    adding an indication of an advertisement selected by the one of the plurality of advertisers to the instance of metadata within the container media format associated with the advertising slot; and
    providing the container media format including the content and the instance of metadata associated with the advertising slot to a media player capable of supporting the container media format;
    wherein the advertisement selected by the one of the plurality of advertisers is received by the media player from the one of the plurality of advertisers;
    wherein the media player inserts the advertisement into the content utilizing the instance of metadata associated with the advertising slot within the container media format and displays the content with the advertisement.

2. The method of claim 1, wherein the content includes digital video content.

3. The method of claim 2, wherein the digital video content includes a digital video game.

4. The method of claim 1, wherein the advertising slot includes a portion of a frame of the content in which the advertisement is capable of being presented.

5. The method of claim 1, wherein the advertisement is interactive.

6. The method of claim 1, and further comprising charging the one of the plurality of advertisers associated with the inserted advertisement.

7. A system, comprising:
    a processor for:
        identifying an advertising slot that has been inserted into content having a first format, where the content includes a plurality of frames;
        determining a plurality of keywords associated with the advertising slot;
        converting the content into a container media format different from the first format;
        storing within the container media format a header section utilized for identifying the content, a file information section that includes a file location of the content, a track information section that includes data associated with tracks of the content, a chapter information section that includes data associated with each chapter of the content, a track data section that includes a portion of the content to be presented, and an instance of metadata associated with the advertising slot, where the instance of metadata includes:
            a frame start indicator indicating the frame within the content in which the advertising slot starts,
            a frame end indicator indicating the frame within the content in which the advertising slot ends, position data that identifies a location where the advertising slot is located within the plurality of frames of the content,
a keyword number indicating a number of the plurality of keywords, and
the plurality of keywords associated with the advertising slot;
providing the content and the instance of metadata within the container media format to a plurality of advertisers;
receiving a bid on one of the plurality of keywords within the container media format from one of the plurality of advertisers;
adding an indication of an advertisement selected by the one of the plurality of advertisers to the instance of metadata within the container media format associated with the advertising slot; and
providing the container media format including the content and the instance of metadata associated with the advertising slot to a media player capable of supporting the container media format;
wherein the advertisement selected by the one of the plurality of advertisers is received by the media player from the one of the plurality of advertisers;
wherein the media player inserts the advertisement into the content utilizing the instance of metadata associated with the advertising slot within the container media format and displays the content with the advertisement.

8. A computer program product embodied on a non-transitory computer readable medium, comprising:
computer code for identifying an advertising slot that has been inserted into content having a first format, where the content includes a plurality of frames;
computer code for determining a plurality of keywords associated with the advertising slot;
computer code for converting the content into a container media format different from the first format;
computer code for storing within the container media format a header section utilized for identifying the content, a file information section that includes a file location of the content, a track information section that includes data associated with tracks of the content, a chapter information section that includes data associated with each chapter of the content, a track data section that includes a portion of the content to be presented, and an instance of metadata associated with the advertising slot, where the instance of metadata includes:
a frame start indicator indicating the frame within the content in which the advertising slot starts,
a frame end indicator indicating the frame within the content in which the advertising slot ends,
position data that identifies a location where the advertising slot is located within the plurality of frames of the content,
a keyword number indicating a number of the plurality of keywords, and
the plurality of keywords associated with the advertising slot;
computer code for providing the content and the instance of metadata within the container media format to a plurality of advertisers;
computer code for receiving a bid on one of the plurality of keywords within the container media format from one of the plurality of advertisers;
computer code for adding an indication of an advertisement selected by the one of the plurality of advertisers to the instance of metadata within the container media format associated with the advertising slot; and
computer code for providing the container media format including the content and the instance of metadata associated with the advertising slot to a media player capable of supporting the container media format;
wherein the computer program product is operable such that the advertisement selected by the one of the plurality of advertisers is received by the media player from the one of the plurality of advertisers;
wherein the computer program product is operable such that the media player inserts the advertisement into the content utilizing the instance of metadata associated with the advertising slot within the container media format and displays the content with the advertisement.

9. The method of claim 1, wherein the frame start indicator describes a hash signature of the frame within the content in which the advertising slot starts.

10. The method of claim 1, wherein the plurality of keywords are generated automatically based on phrases within the content that are written and spoken.

11. The method of claim 6, wherein the one of the plurality of advertisers is charged based on a number of presentations of the advertisement to viewers and a number of selections by the viewers to interact with the advertisement.

12. The method of claim 1, wherein the content includes a video in which a billboard utilized for advertising is presented, the billboard is identified as the advertising slot, and the advertisement is presented on the billboard during a presentation of the video.

* * * * *